(12) United States Patent
Olenzek et al.

(10) Patent No.: US 11,858,077 B1
(45) Date of Patent: Jan. 2, 2024

(54) ALIGNMENT TOOLS AND METHODS FOR ALIGNING COMPONENTS THEREWITH

(71) Applicant: GM GLOBAL TECHNOLOGY OPERATIONS LLC, Detroit, MI (US)

(72) Inventors: Richard F Olenzek, Farmington Hills, MI (US); Glenn Allan Loriaux, Jr., Saint Helen, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/332,659

(22) Filed: Jun. 9, 2023

(51) Int. Cl.
*B25B 27/14* (2006.01)
*B23P 19/10* (2006.01)
*F16H 1/28* (2006.01)
*B23P 19/12* (2006.01)

(52) U.S. Cl.
CPC .............. *B23P 19/10* (2013.01); *B25B 27/14* (2013.01); *B23P 19/12* (2013.01); *F16H 1/28* (2013.01); *Y10T 29/49464* (2015.01); *Y10T 29/49465* (2015.01); *Y10T 29/53913* (2015.01)

(58) Field of Classification Search
CPC .... B23P 19/12; B25B 27/14; Y10T 29/49464; Y10T 29/49465; Y10T 29/53913
See application file for complete search history.

(56) References Cited

U.S. PATENT DOCUMENTS

| | | | | |
|---|---|---|---|---|
| 3,842,481 | A | * | 10/1974 | Laing .................... F16H 57/082 29/434 |
| 4,089,408 | A | * | 5/1978 | Vanderhoof ........... B65G 17/34 198/803.2 |
| 4,811,647 | A | * | 3/1989 | Lindamood ............. B25B 13/06 81/125 |
| 2006/0264955 | A1 | * | 11/2006 | Abdelgany ............ A61B 17/17 606/79 |
| 2016/0032958 | A1 | * | 2/2016 | Dille ..................... F16B 39/103 417/313 |

* cited by examiner

*Primary Examiner* — Jermie E Cozart
(74) *Attorney, Agent, or Firm* — Lorenz & Kopf LLP (57) ABSTRACT

Alignment tools and methods are provided for assembling a planetary gear sets. The alignment tools include a handle, and an elongated pin having a tip configured to be inserted through a mounting hole of a housing of the planetary gear set, through a first hole in a first washer, through a bore of a pinion gear between pinion needle rollers arranged in a tubular pattern within the bore, and through a second hole of a second washer. The elongated pin is configured to align the first washer, the pinion gear, the pinion needle rollers, and the second washer during insertion therethrough. The elongated pin is retractable relative to the handle in response to a force being applied to the tip in a first direction along a longitudinal axis of the elongated pin.

17 Claims, 5 Drawing Sheets

ALIGNMENT TOOLS AND METHODS FOR ALIGNING COMPONENTS THEREWITH

INTRODUCTION

The technical field generally relates to assembly of planetary gear systems, and more particularly relates to methods for manual assembly of a planetary gear set using an alignment tool.

A planetary gear set includes multiple gears working together to achieve various speed and torque ratios. In general, a planetary gear set includes a sun gear connected to an input or output shaft, pinion gears (i.e., planet gears) that surround and mesh with the sun gear, and a ring gear that surrounds and meshes with the planet gears.

Proper alignment of the many components of planetary gear sets can be challenging. Accordingly, there is an ongoing desire for improved methods for assembling planetary gear sets. Furthermore, other desirable features and characteristics of the present invention will become apparent from the subsequent detailed description and the appended claims, taken in conjunction with the accompanying drawings and the foregoing technical field and background.

SUMMARY

An alignment tool is provided for use in assembling a planetary gear set. In one implementation, the alignment tool includes a handle and an elongated pin having a tip configured to be inserted through a mounting hole of a housing of the planetary gear set, through a first hole in a first washer, through a bore of a pinion gear, between pinion needle rollers arranged in a tubular pattern within the bore of the pinion gear, and then through a second hole of a second washer, wherein the elongated pin is configured to align the first washer, the pinion gear, the pinion needle rollers, and the second washer during insertion of the elongated pin through the first hole, the bore between the pinion needle rollers, and the second hole. The elongated pin is retractable relative to the handle in response to a force being applied to the tip in a first direction along a longitudinal axis of the elongated pin.

In various examples, the alignment tool includes a body having a first end, a second end distal to the first end, and interior surfaces that define a cavity within the body between the first end and the second end, and a biasing member located within the cavity of the body and configured to apply a biasing force on the elongated pin in a second direction from the second end of the body toward the first end of the body along the longitudinal axis of the elongated pin. The tip extends outwardly from the first end of the body, wherein at least a portion of the elongated pin is configured to retract into the cavity of the body in response to the force being applied to the tip thereof that is greater than the biasing force.

In various examples, the body of the alignment tool defines at least part of the handle.

In various examples, the alignment tool includes a sliding member located and retained within the cavity of the body and configured to slide within the cavity between the first end and the second end. The elongated pin includes a proximal end oppositely disposed the tip thereof, wherein the proximal end of the elongated pin is in a fixed relationship with the sliding member such that the elongated pin is at least partially retracted within the cavity as the sliding member slides toward the second end of the body and the elongated pin is extended from the cavity as the sliding member slides toward the first end of the body.

In various examples, at least a portion of the body of the alignment tool is transparent such that the sliding member is viewable from an exterior of the body.

In various examples, the alignment tool includes at least one marking on the portion of the body that is transparent is configured to promote awareness of the retraction of the elongated pin.

In various examples, the at least one marking of the alignment tool is indicative of the threshold force sufficient to damage the first washer, the second washer, the pinion needle rollers, or the pinion gear, or indicative of contact between the tip of the elongated pin and at least one of the first washer, the pinion needle rollers, the pinion gear, and the second washer.

In various examples, the alignment tool includes at least one marking on the elongated pin configured to promote awareness of the retraction of the elongated pin.

In various examples, the at least one marking of the alignment tool is indicative of the threshold force sufficient to damage the first washer, the second washer, or the pinion gear or indicative of contact between the tip of the elongated pin and at least one of the first washer, the pinion gear, and the second washer.

In various examples, the alignment tool includes a stopper member configured to limit insertion of the elongated pin through the mounting hole.

In various examples, the stopper member of the alignment tool includes a hole and the elongated pin extends through the hole such that the stopper member surrounds a portion of the elongated pin.

In various examples, the biasing member of the alignment tool is configured to apply the biasing force on the sliding member in the second direction toward the first end of the body, wherein the biasing force is less than a threshold force likely to damage the first washer, the second washer, or the pinion needle rollers upon contact by the tip therewith while the elongated pin is fully retracted.

A method for assembling a planetary gear set. In one implementation, the method includes inserting an assembly of a pinion gear, pinion needle rollers arranged in a tubular pattern within a bore of the pinion gear, at least a first washer adjacent to a first end of the pinion gear and at least a second washer adjacent to a second end of the pinion gear into a cavity of a housing that is configured to rotatably support the assembly, wherein the first washer and the second washer each include holes aligned with the bore of the pinion gear extending between the first end and the second end of the pinion gear while arranged in the assembly, wherein the bore of the pinion gear with the pinion needle rollers therein, a first hole of the first washer, and a second hole of the second washer all align with a mounting hole of the housing, inserting an elongated pin of an alignment tool through the mounting hole, through the first hole of the first washer, through the bore of the pinion gear between the pinion needle rollers, and through the second hole of the second washer, wherein the elongated pin is configured to retract relative a handle of the alignment tool upon application of a force applied to a tip of the elongated pin, removing the elongated pin from the mounting hole and arranging the pinion gear, the pinion needle rollers, the first washer, and the second washer to align the bore of the pinion gear with the pinion needle rollers therein, the first hole of the first washer, and the second hole of the second washer in response to the elongated pin retracting relative to the handle of the alignment tool, and removing the elongated pin from the mounting hole in response to the elongated pin fully passing through the bore of the pinion gear between the pinion needle rollers, the first hole of the first washer, and the second hole of the second washer without retracting relative to the handle of the alignment tool.

In various examples, the alignment tool used in the method includes a body having a first end, a second end oppositely disposed the first end, and interior surfaces that define a cavity within the body between the first end and the second end, wherein the tip of the elongated pin extends outwardly from the first end of the body, wherein at least a portion of the elongated pin is configured to retract into the cavity of the body in response to the force being applied to the tip thereof, the method further comprising, while inserting the elongated pin of the alignment tool through the mounting hole and into the assembly, monitoring for retraction of the elongated pin into the body of the alignment tool via a transparent portion of the body.

In various examples, the method includes removing the elongated pin from the mounting hole and arranging the pinion gear, the pinion needle rollers, the first washer, and the second washer to align the bore of the pinion gear with the pinion needle rollers therein, the first hole of the first washer, and the second hole of the second washer in response to the elongated pin retracting into the body of the alignment tool beyond a marking located on the transparent portion of the body.

In various examples, the at least one marking on the transparent portion of the body of the alignment tool used in the method is indicative of the threshold force sufficient to damage the first washer, the second washer, the pinion needle rollers, or the pinion gear, or indicative of contact between the tip of the elongated pin and at least one of the first washer, the pinion gear, and the second washer.

In various examples, the body of the alignment tool used in the method defines at least part of the handle.

In various examples, the method includes, while inserting the elongated pin of the alignment tool through the mounting hole and into the assembly, monitoring for retraction of the elongated pin relative to the handle of the alignment tool by observing a marking located on the elongated pin.

In various examples, the method includes applying a biasing force on the elongated pin in a second direction from an end of the elongated pin toward the tip of the elongated pin along a longitudinal axis thereof, wherein the biasing force is less than a threshold force likely to damage the first washer, the second washer, or the pinion needle rollers upon contact by the tip therewith while the elongated pin is fully retracted.

In various examples, the method includes inserting the elongated pin of the alignment tool through the mounting hole and into the assembly until contact occurs between an exterior surface of the housing and a stopping member of the alignment tool.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
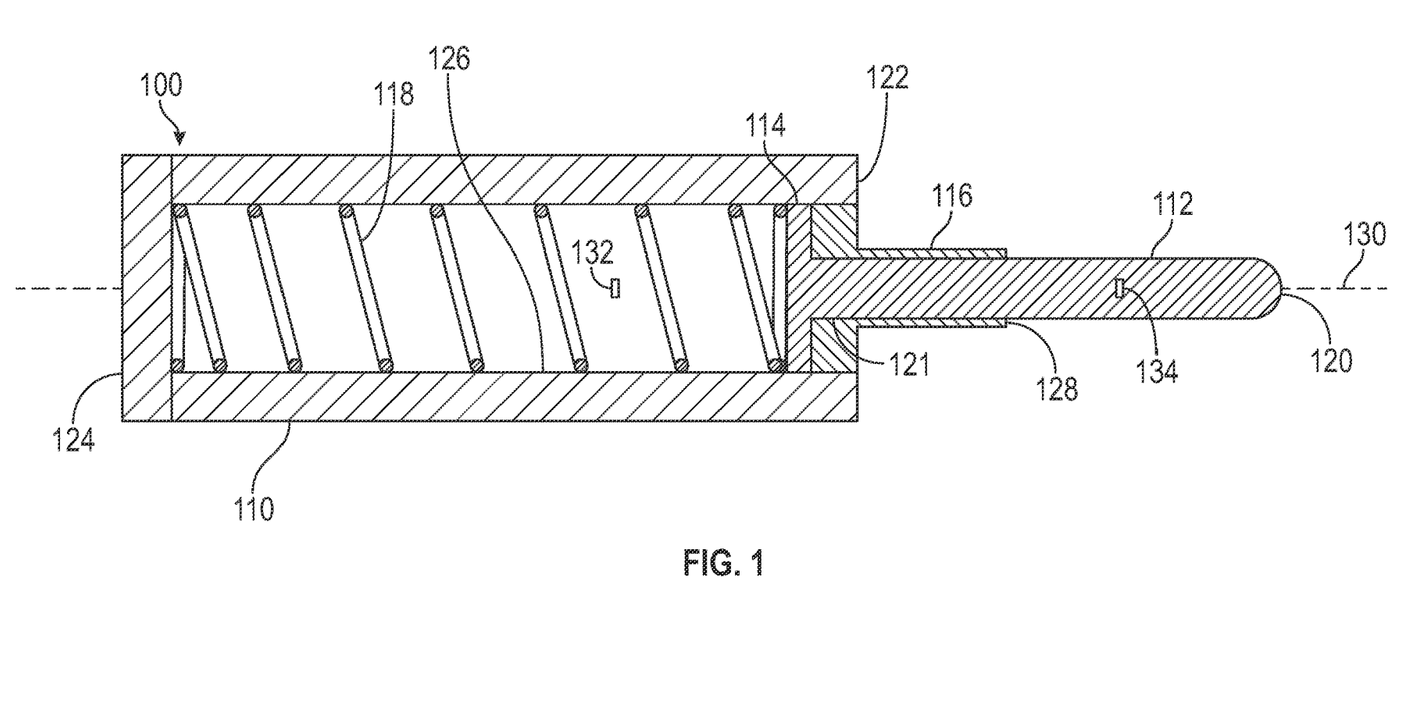
FIG. 1 is a cross-sectional side view of an alignment tool for assembling components of a planetary gear set in accordance with an embodiment.

FIG. 1 represents a cross-sectional view of a handheld alignment tool 100 configured for use in aligning components of planetary gear sets during assembly of the planetary gear sets. The alignment tool 100 includes a body 110 having a first end 122, a second end 124 oppositely disposed the first end 122. Interior surfaces 126 of the body 110 define a cavity within the body 110 between the first end 122 and the second end 124. An opening in the first end 122 of the body 110 provided access to the cavity therein. In this example, the body 110 is configured as a handle configured to be gripped by a user. However, in various examples a separate handle may be fixed relative to the body 110.

An elongated pin 112 extends outwardly from the first end 122 of the body 110. The pin 112 includes a distal end 120 that defines a tip of the pin 112 and a proximal end 121 opposite the distal end 120 that is located adjacent to or within the body 110. The tip may have various shapes, such as, but not limited to, a rounded shape as represented in the figures. The proximal end 121 of the pin 112 is in a fixed relationship with and/or fixed directly to a sliding member 114. The sliding member 114 is located and retained within the cavity of the body 110 and configured to slide within the cavity between the first end 122 and the second end 124 of the body 110. A biasing member 118 is located within the cavity of the body 110 and configured to apply a biasing force on the sliding member 114 in a direction from the second end 124 of the body 110 toward the first end 122 of the body 110 along the longitudinal axis 130 of the pin 112. The biasing member 118 may include, for example, a preloaded spring.

Since the sliding member 114 is located between the pin 112 and the biasing member 118 and in contact therewith, forces applied to the sliding member 114 are transferred between the biasing member 118 and the pin 112. Specifically, the biasing force is applied from the biasing member 118 to the pin 112 through the sliding member 114, and any forces applied to the tip of the pin 112 are applied to the biasing member 118 through the sliding member 114. Notably, with this arrangement, the pin 112 is configured to retract into the body 110 in response to a force being applied to the tip in a direction along a longitudinal axis 130 of the pin 112 in a direction from the distal end 120 towards the proximal end 121 thereof, that is, opposite the direction of and greater in magnitude of the biasing force.

Figure 4:
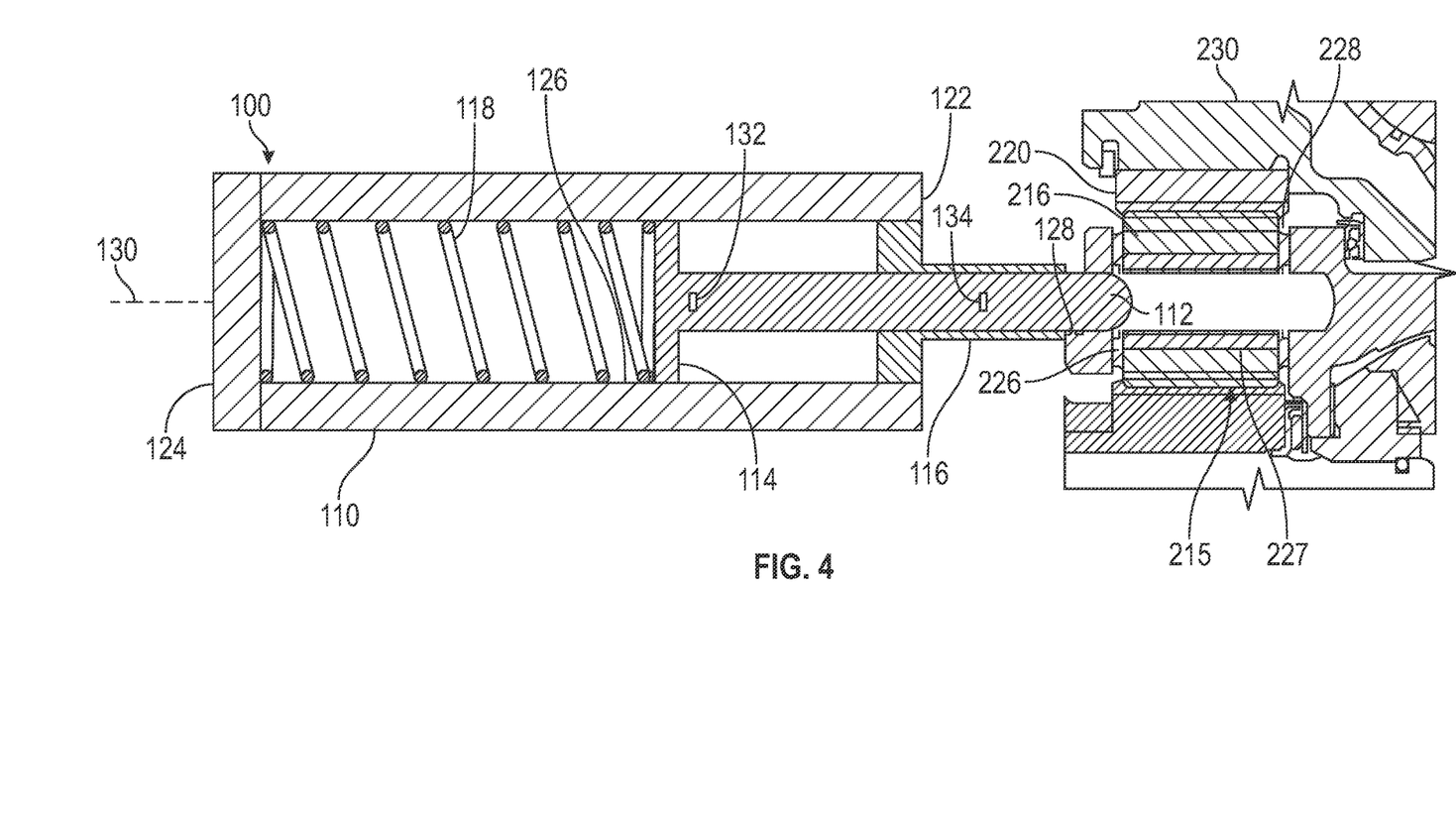
FIG. 4 is a cross-sectional view of the alignment tool of FIG. 1 inserted into a partially assembled planetary gear set during assembly thereof that illustrates a reaction of the alignment tool in response to a misalignment of the components of the planetary gear set in accordance with an embodiment.

FIG. 1 represents the alignment tool 100 in an initial state, wherein the pin 112 is fully extended from the body 110. In this initial state, the biasing force applied by the biasing member 118 causes the sliding member 114 to be located in a furthest position within the cavity toward the first end 122 of the body 110. Application of sufficient force to the tip of the pin 112 that is in excess of the biasing force causes the biasing member 118 to compress, the sliding member 114 to slide in a direction toward the second end 124 of the body 110, and at least a portion of the pin 112 to retract within the cavity (FIG. 4). If the force on the tip of the pin 112 is released or reduced to a magnitude that is less than the magnitude of the biasing force, than the biasing member 118 will expand, the sliding member 114 will slide in a direction toward the first end 122 of the body 110, and at least a portion of the pin 112 will extend from the cavity.

Figure 3:
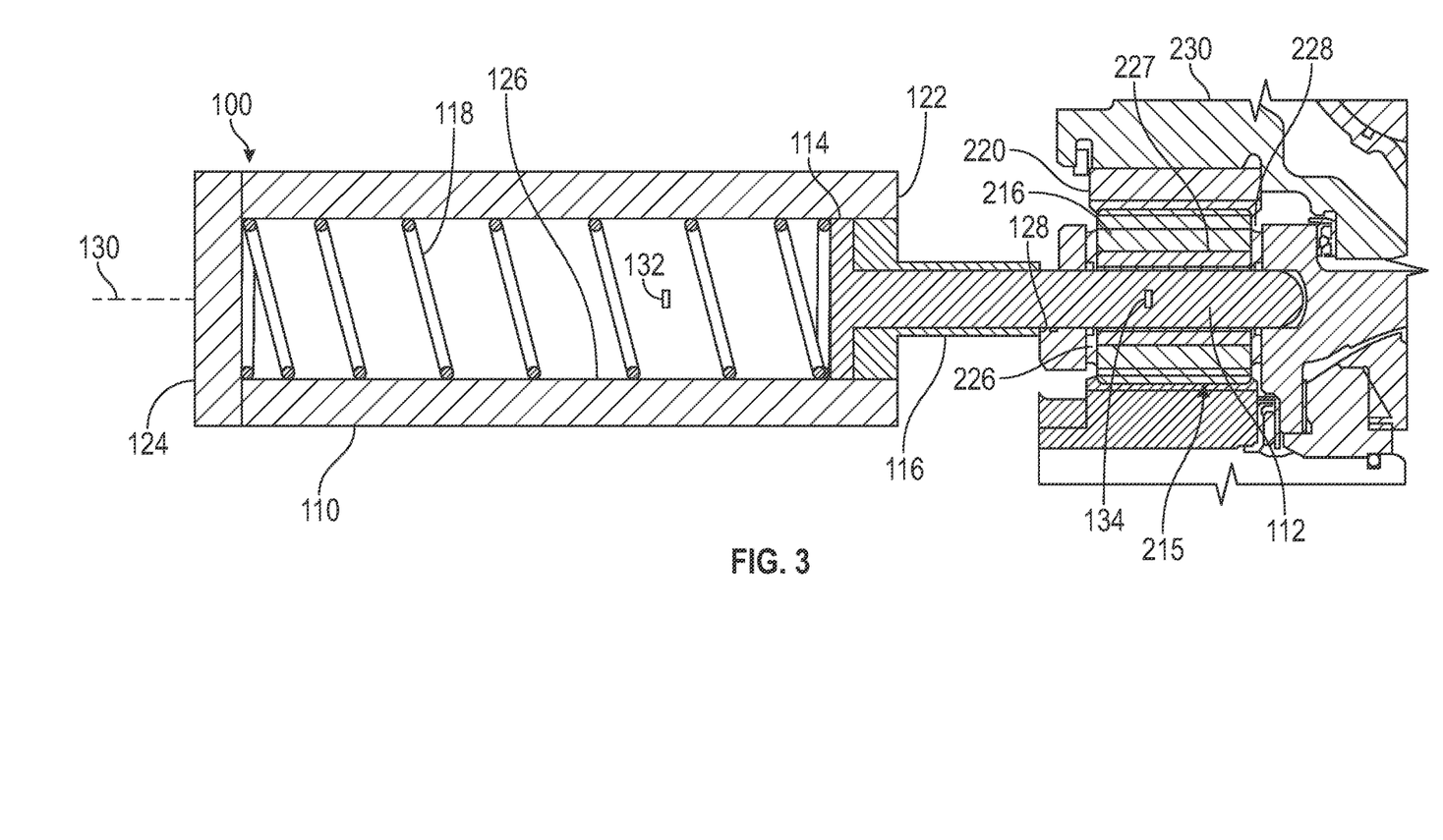
FIG. 3 is a cross-sectional view of the alignment tool of FIG. 1 inserted into a partially assembled planetary gear set during assembly thereof in accordance with an embodiment.

In some examples, the alignment tool 100 includes one or more markings configured to promote ease of use of the tool, especially for monitoring the pin 112 for retract into the cavity. In some examples, a portion or an entirety of the body 110 is sufficiently transparent such that the sliding member 114 and/or the retracted portions of the pin 112 within the cavity are viewable from an exterior of the body 110. Alternatively, or in addition to the above, alignment tool 100 may include at least one marking on the elongated pin 112 that may be observed to note retraction of the pin 112. For example, FIGS. 3 and 4 represent a first marking 132 located on a transparent portion of the body 110 and a second marking 134 located on exterior surfaces of the pin 112.

The markings may indicate various relevant parameters. In various examples, the marking(s) may be indicative of contact between the tip of the pin 112 and another article. In various examples, the marking(s) may be indicative of application of a force to the tip of the elongated pin 112 that is in excess of a predetermined threshold force. In various examples, the alignment tool 100 may be configured to reduce the likelihood of damaging articles contacted with the tip thereof. In such examples, the predetermined threshold force may be indicative of a minimum force likely to damage such articles. Alternatively, the alignment tool 100 may be configured such that the biasing force is less than the predetermined threshold force likely to damage the articles upon contact by the tip therewith while the elongated pin 112 is fully retracted. In such examples, the pin 112 could fully retract into the body 110 prior to achieving the predetermined threshold force.

In various examples, the alignment tool 100 may include a stopper member 116 configured to limit insertion of the pin 112. The stopper member 116 may have various structures. In some examples, the stopper member 116 is configured to physically contact a portion of differential to limit insertion of the pin 112. In the example of FIGS. 1-4, the stopper member 116 is fixed to the first end 122 of the body 110. The stopper member 116 includes a hole and the pin 112 extends through the hole such that the stopper member 116 surrounds a portion of the pin 112. As represented in FIG. 3, a distal end 128 of the stopper member 116 contacts a surface of a differential subsequent to the pin 112 fully passing the components to be aligned and prior to the distal end 120 of the pin 112 contacting a surface of the differential located past the components to be aligned.

Figure 2:
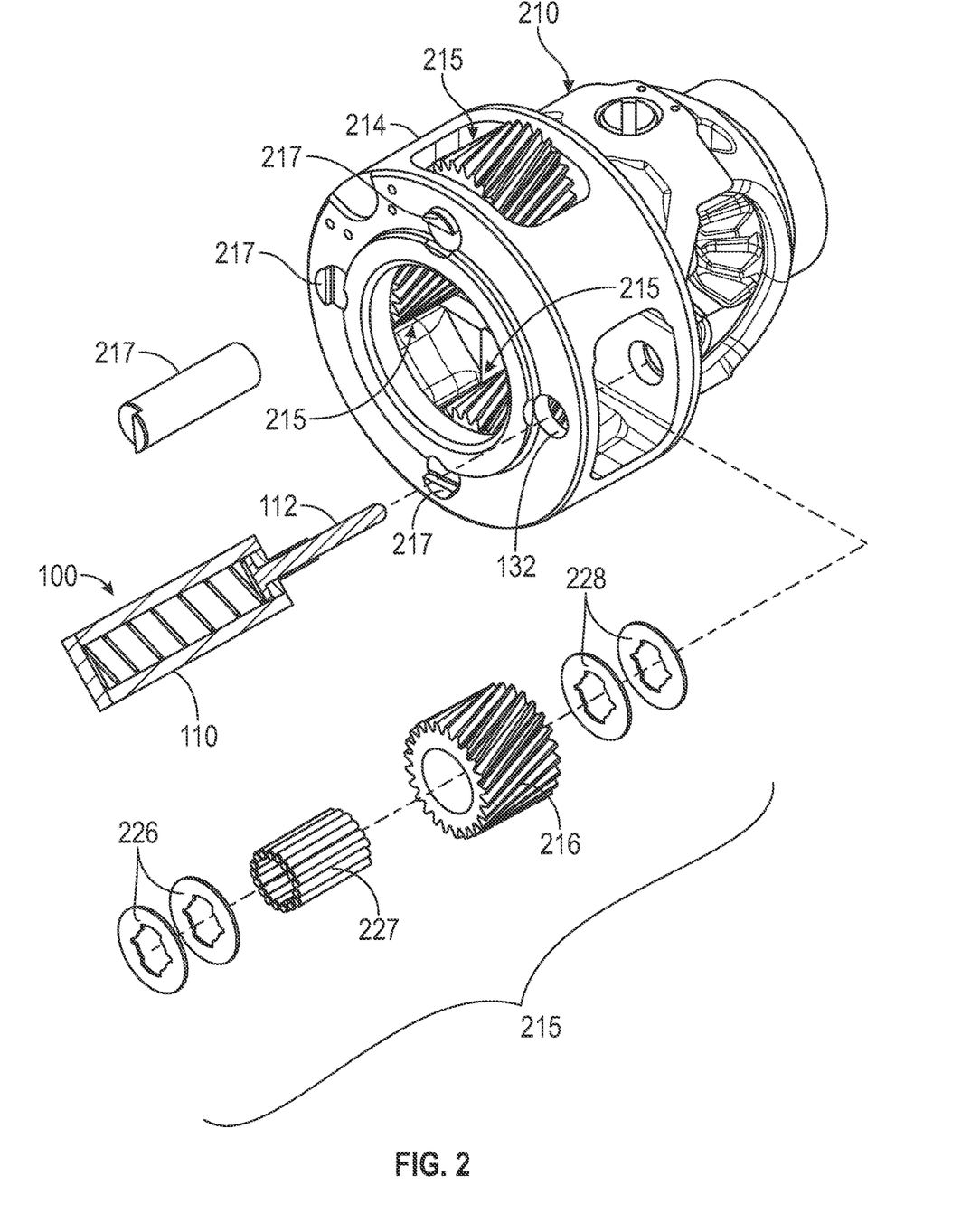
FIG. 2 schematically represents a relationship between the alignment tool of FIG. 1 and certain components of the planetary gear set during assembly thereof in accordance with an embodiment.
Figure 5:
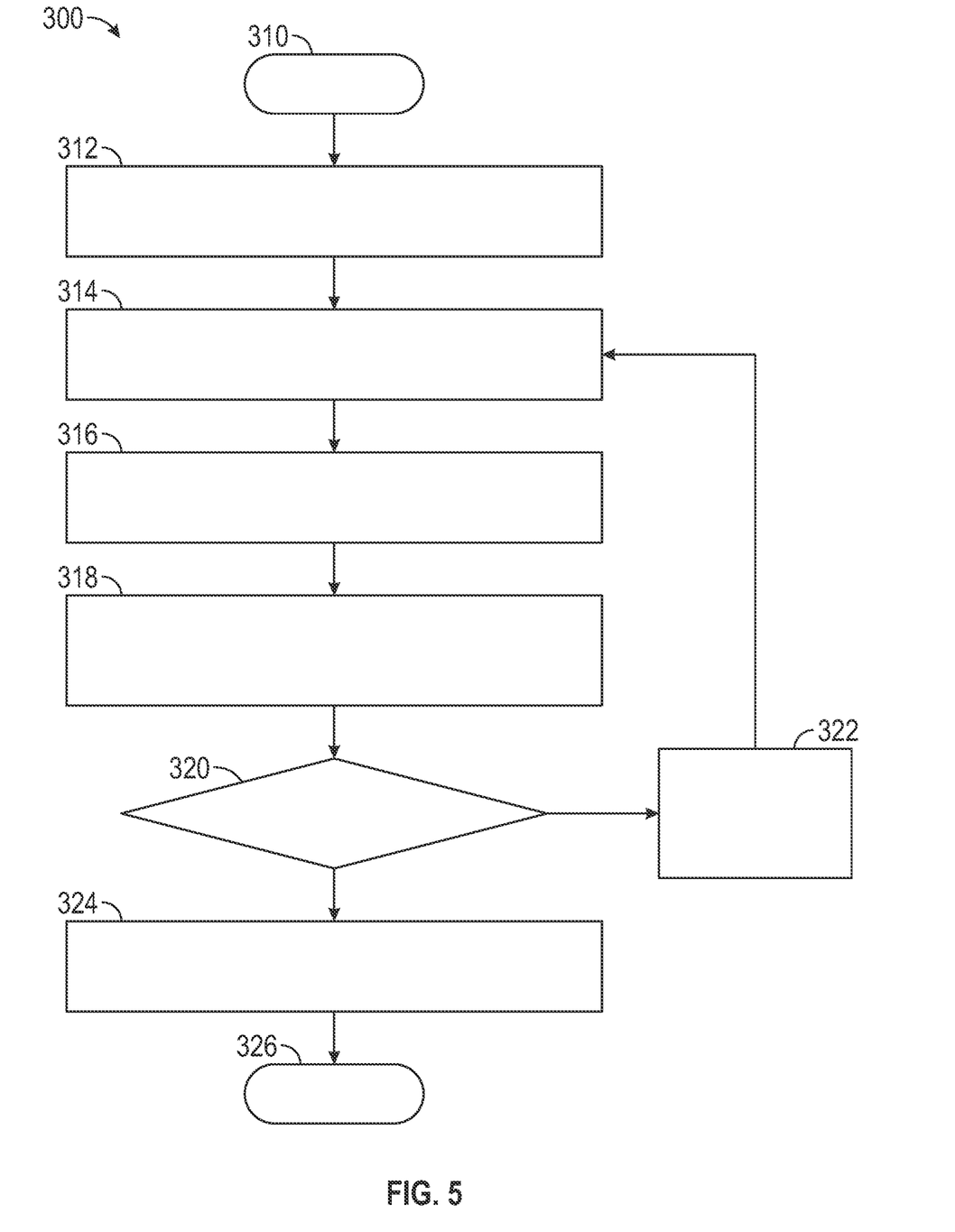
FIG. 5 is a flowchart representing a method for assembling certain components of a planetary gear set in accordance with an embodiment.

As noted previously, the alignment tool 100 is configured for use in aligning components of planetary gear sets during manual assembly thereof. FIGS. 2-4 illustrate use of the alignment tool 100 for assembling certain components of a planetary gear set of a differential for a vehicle. Further, in FIG. 5 a flowchart provides a method 300 for assembling the planetary gear set using the alignment tool 100 in accordance with exemplary examples. As can be appreciated in light of the disclosure, use of the alignment tool 100 is not limited to the specific application represented in FIGS. 2-4, and the alignment tool 100 may be used for assembling planetary gear sets for a variety of systems and may have various structures and components. In addition, the order of operation within the method 300 is not limited to the sequential execution as illustrated in FIG. 5, but may be performed in one or more varying orders as applicable and in accordance with the present disclosure.

Once fully assembled, the differential includes a housing 210. An end 214 of the housing 210 functions as a carrier for a planetary gear set. Specifically, the end 214 of the housing 210 rotatably supports a set of pinion gears 216 supported on pins 217 secured to the housing 210. A ring gear 220 and a sun gear (not shown) are intermeshed with the pinion gears 216. A plurality of washers 226, 228 are located between the pinion gears 216 and the end 214. The ring gear 220 surrounds the pinion gears 216 and is connected for common rotation with a stationary element 230, such as a housing of a transmission of a vehicle. The sun gear may be connected to an input or output shaft.

During assembly, the individual pinion gears 216 are arranged in an assembly 215 with the plurality of washers 226, 228 and inserted into the housing 210 in their respective locations. Once in their respective locations, the alignment tool 100 may be used to ensure the pinion gears 216 and the plurality of washers 226, 228 are properly aligned, as described in more detail below. After completion of the alignment, the pinion gears 216 may be each secured with the aforementioned pins. Although the assembly 215 is represented in this example as include a total of four washers, two in the first set of washers 226 and two in the second set of washers 228, it should be understood that the first set of washers 26 and the second set of washers 228 may include fewer or more washers, such as one washer, three washers, four washers, etc., and that such washers may have identical or different structures.

As such, the method 300 may start at 310. At 312, the method 300 may include providing the differential in a partially assembled state, that is, without the pinion gears 216 installed in the housing 210. For convenience, each of the pinion gears 216 will be referred to as having a first end, a second end, and a bore extending between the first end and the second end. At 314, the method 300 may include providing an assembly of a first of the pinion gears 216, a plurality of pinion needle rollers 227 within the bore of the pinion gears 216, and at least a first set of the plurality of washers 226 adjacent to the first end of the first pinion gear 216 and at least a second set of the plurality of washers 228 adjacent to the second end of the first pinion gear 216. The plurality of washers 226, 228 each include holes that, while arranged in the aforementioned assembly, are preferably aligned with bore of the first pinion gear 216. At 316, the method 300 may include inserting the assembly into the cavity of the housing 210 such that the bore of the first pinion gear 216 (having the pinion needle rollers 227 arranged in a tubular pattern along inner surfaces of the bore), the holes of the first set of washers 226, and the holes of the second set of washers 226 all align with a mounting hole 232 of the housing 210.

At 318, the method 300 may include inserting the pin 112 of the alignment tool 100 through the mounting hole 232, through the holes of the first set of washers 226, into the bore of the first pinion gear 216 between the pinion needle rollers 227, and through the holes of the second set of washers 228. During insertion of the pin 112, the pin 112 is configured to align the first set of washers 226, the first pinion gear 216, the pinion needle rollers 227, and the second set of washers 228 to a tolerance sufficient for operation of the planetary gear set upon completion of the assembly thereof. To this end, the tip of the pin 112 may be rounded (as shown) or otherwise configured to promote lateral movement of any of the first set of washers 226, the first pinion gear 216, the pinion needle rollers 227, and the second set of washers 228 that may be offset from proper alignment. The diameter of the pin 112 is sized to match the inner diameters of the first set of washers 228, the bore of the first pinion gear 216 with the pinion needle rollers 227 therein, and/or the second set of washers 228 at least to an extent necessary to provide the desired alignment tolerance. However, if any one of the first set of washers 226, the first pinion gear 216, the pinion needle rollers 227, and the second set of washers 228 are offset to an extent that insertion of the pin 112 is impeded, the pin 112 is configured to retract into the body 110 upon application of a sufficient force applied by the user.

At 320, the method 300 may include determining whether the pin 112 retracts into the body 110 during insertion of the pin 112. In various examples, determining retraction of the pin 112 may be performed by visually monitoring for retraction of the pin 112 into the body 110 of the alignment tool 100 via a transparent portion of the body 110. In such examples, the retraction of the pin 112 may be compared to the first marking 132 located on the transparent portion of the body 110. In various examples, determining retraction of the pin 112 may be performed by observing the second marking 134 located on the pin 112, for example, relative to another portion of the alignment tool 100.

If the pin 112 retracts at all or retracts by predetermined dimension, the method 300 may include, at 322, removing the pin 112 from the mounting hole 232 and rearranging the first set of washers 226, the first pinion gear 216, the pinion needle rollers 227, and the second set of washers 228 to realign the bore of the first pinion gear 216 with the pinion needle rollers 227 therein and the holes of the first set of washers 226 and the second set of washers 228. Thereafter, steps 318 and 320 may be repeated until proper alignment has been achieved. In various examples, the method 300 may include continuing to insert the pin 112 of the alignment tool 100 through the mounting hole 232 and into the bore of the first pinion gear 216 until contact occurs between an exterior surface of the housing 210 and the stopper member 116 of the alignment tool 100.

If, at 320, the pin 112 does not retract at all or does not retract by the predetermined dimension, the method 300 may include, at 324, removing the pin 112 from the mounting hole 232 and completing the assembly of the differential. The method 300 may end at 326.

The alignment tool 100 and the method 300 provide various benefits over certain existing systems and methods. For example, assembly of planetary gear sets with fixed tools (i.e., that do not retract) may cause unintended forces to be applied to misaligned components, such as one or more of the pinion gears 216, the pinion needle rollers 227, the first set of washers 226, or the second set of washers 228. The alignment tool 100 provides the capability of aligning components without application of unintended forces thereto by ensuring that the pin 112 retracts relative to the body 110 in response to contact by the distal end 120 with a surface. As such, the alignment tool 100 and the method 300 effectuate an improvement in the technical field of planetary gear set assembly.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An alignment tool for use in assembling a planetary gear set, comprising:
    a body having a first end, a second end distal to the first end, and interior surfaces that define a cavity within the body between the first end and the second end;
    a handle;
    an elongated pin having a tip configured to be inserted through a mounting hole of a housing of the planetary gear set, through a first hole in a first washer, through a bore of a pinion gear, between pinion needle rollers arranged in a tubular pattern within the bore of the pinion gear, and then through a second hole of a second washer, wherein the elongated pin is configured to align the first washer, the pinion gear, the pinion needle rollers, and the second washer during insertion of the elongated pin through the first hole, the bore between the pinion needle rollers, and the second hole, wherein the elongated pin is retractable relative to the handle in response to a force being applied to the tip in a first direction along a longitudinal axis of the elongated pin;
    a biasing member located within the cavity of the body and configured to apply a biasing force on the elongated pin in a second direction from the second end of the body toward the first end of the body along the longitudinal axis of the elongated pin, wherein the tip extends outwardly from the first end of the body, wherein at least a portion of the elongated pin is configured to retract into the cavity of the body in response to the force being applied to the tip thereof that is greater than the biasing force, and;
    a sliding member located and retained within the cavity of the body and configured to slide within the cavity between the first end and the second end, wherein the elongated pin includes a proximal end oppositely disposed the tip thereof, wherein the proximal end of the elongated pin is in a fixed relationship with the sliding member such that the elongated pin is at least partially retracted within the cavity as the sliding member slides toward the second end of the body and the elongated pin is extended from the cavity as the sliding member slides toward the first end of the body,
    wherein at least a portion of the body is transparent such that the sliding member is viewable from an exterior of the body.

2. The alignment tool of claim 1, wherein the body defines at least part of the handle.

3. The alignment tool of claim 1, further comprising at least one marking on the portion of the body that is transparent is configured to promote awareness of the retraction of the elongated pin.

4. The alignment tool of claim 3, wherein the at least one marking is indicative of the threshold force sufficient to damage the first washer, the second washer, the pinion needle rollers, or the pinion gear, or indicative of contact between the tip of the elongated pin and at least one of the first washer, the pinion needle rollers, the pinion gear, and the second washer.

5. The alignment tool of claim 1, further comprising at least one marking on the elongated pin configured to promote awareness of the retraction of the elongated pin.

6. The alignment tool of claim 5, wherein the at least one marking is indicative of the threshold force sufficient to damage the first washer, the second washer, or the pinion gear or indicative of contact between the tip of the elongated pin and at least one of the first washer, the pinion gear, and the second washer.

7. The alignment tool of claim 1, further comprising a stopper member configured to limit insertion of the elongated pin through the mounting hole.

8. The alignment tool of claim 7, wherein the stopper member includes a hole and the elongated pin extends through the hole such that the stopper member surrounds a portion of the elongated pin.

9. The alignment tool of claim 1, wherein the biasing member is configured to apply the biasing force on the sliding member in the second direction toward the first end of the body, wherein the biasing force is less than a threshold force likely to damage the first washer, the second washer, or the pinion needle rollers upon contact by the tip therewith while the elongated pin is fully retracted.

10. A method for assembling a planetary gear set, the method comprising:
   inserting an assembly of a pinion gear, pinion needle rollers arranged in a tubular pattern within a bore of the pinion gear, at least a first washer adjacent to a first end of the pinion gear and at least a second washer adjacent to a second end of the pinion gear into a cavity of a housing that is configured to rotatably support the assembly, wherein the first washer and the second washer each include holes aligned with the bore of the pinion gear extending between the first end and the second end of the pinion gear while arranged in the assembly, wherein the bore of the pinion gear with the pinion needle rollers therein, a first hole of the first washer, and a second hole of the second washer all align with a mounting hole of the housing;
   inserting an elongated pin of an alignment tool through the mounting hole, through the first hole of the first washer, through the bore of the pinion gear between the pinion needle rollers, and through the second hole of the second washer, wherein the elongated pin is configured to retract relative a handle of the alignment tool upon application of a force applied to a tip of the elongated pin;
   removing the elongated pin from the mounting hole and arranging the pinion gear, the pinion needle rollers, the first washer, and the second washer to align the bore of the pinion gear with the pinion needle rollers therein, the first hole of the first washer, and the second hole of the second washer in response to the elongated pin retracting relative to the handle of the alignment tool; and
   removing the elongated pin from the mounting hole in response to the elongated pin fully passing through the bore of the pinion gear between the pinion needle rollers, the first hole of the first washer, and the second hole of the second washer without retracting relative to the handle of the alignment tool.

11. The method of claim 10, wherein the alignment tool includes a body having a first end, a second end oppositely disposed the first end, and interior surfaces that define a cavity within the body between the first end and the second end, wherein the tip of the elongated pin extends outwardly from the first end of the body, wherein at least a portion of the elongated pin is configured to retract into the cavity of the body in response to the force being applied to the tip thereof, the method further comprising, while inserting the elongated pin of the alignment tool through the mounting hole and into the assembly, monitoring for retraction of the elongated pin into the body of the alignment tool via a transparent portion of the body.

12. The method of claim 11, further comprising, removing the elongated pin from the mounting hole and arranging the pinion gear, the pinion needle rollers, the first washer, and the second washer to align the bore of the pinion gear with the pinion needle rollers therein, the first hole of the first washer, and the second hole of the second washer in response to the elongated pin retracting into the body of the alignment tool beyond a marking located on the transparent portion of the body.

13. The method of claim 12, wherein the at least one marking on the transparent portion of the body is indicative of the threshold force sufficient to damage the first washer, the second washer, the pinion needle rollers, or the pinion gear, or indicative of contact between the tip of the elongated pin and at least one of the first washer, the pinion gear, and the second washer.

14. The method of claim 11, wherein the body defines at least part of the handle.

15. The method of claim 10, further comprising, while inserting the elongated pin of the alignment tool through the mounting hole and into the assembly, monitoring for retraction of the elongated pin relative to the handle of the alignment tool by observing a marking located on the elongated pin.

16. The method of claim 10, further comprising applying a biasing force on the elongated pin in a second direction from an end of the elongated pin toward the tip of the elongated pin along a longitudinal axis thereof, wherein the biasing force is less than a threshold force likely to damage the first washer, the second washer, or the pinion needle rollers upon contact by the tip therewith while the elongated pin is fully retracted.

17. The method of claim 10, further comprising inserting the elongated pin of the alignment tool through the mounting hole and into the assembly until contact occurs between an exterior surface of the housing and a stopping member of the alignment tool.

* * * * *